United States Patent
Turner

[19]

[11] Patent Number: 5,997,003
[45] Date of Patent: Dec. 7, 1999

[54] ANNULAR SEALING ASSEMBLY AND METHODS OF SEALING

[75] Inventor: Edwin C Turner, Houston, Tex.

[73] Assignee: Cooper Cameron Corporation, Houston, Tex.

[21] Appl. No.: 08/788,223

[22] Filed: Jan. 27, 1997

Related U.S. Application Data

[63] Continuation-in-part of application No. 08/444,081, May 17, 1995, abandoned, which is a continuation of application No. 08/052,777, Apr. 26, 1993, abandoned.

[51] Int. Cl.$^6$ ............................................ F16J 15/08
[52] U.S. Cl. ..................... 277/339; 277/335; 277/530; 277/531; 277/543; 277/619
[58] Field of Search ..................... 277/325, 327, 277/335, 344, 647, 530, 531, 566, 639, 564, 588, 339, 543, 619

[56] References Cited

U.S. PATENT DOCUMENTS

| | | |
|---|---|---|
| 308,546 | 11/1884 | Armstrong . |
| 2,075,947 | 4/1937 | Kennedy . |
| 2,107,241 | 2/1938 | Freer ............................................ 309/33 |
| 2,766,956 | 10/1956 | Sarah . |
| 3,184,246 | 5/1965 | Kline ........................................ 277/168 |
| 3,288,472 | 11/1966 | Watkins ..................................... 277/11 |
| 3,326,560 | 6/1967 | Trbovich . |
| 3,378,269 | 4/1968 | Castor . |
| 3,915,462 | 10/1975 | Bruns et al. ............................. 277/647 |
| 4,531,711 | 7/1985 | Bunch et al. ............................ 251/214 |
| 4,766,956 | 8/1988 | Smith et al. . |
| 4,900,041 | 2/1990 | Hopkins et al. ........................... 277/30 |
| 5,031,923 | 7/1991 | Davies ..................................... 277/124 |
| 5,044,672 | 9/1991 | Skeels et al. .............................. 285/98 |
| 5,067,734 | 11/1991 | Boehm, Jr. .............................. 277/236 |
| 5,201,835 | 4/1993 | Hosie ......................................... 277/1 |
| 5,224,715 | 7/1993 | Downes et al. .......................... 277/190 |

*Primary Examiner*—Daniel G. DePumpo
*Attorney, Agent, or Firm*—Conley, Rose & Tayon, P.C.

[57] ABSTRACT

Methods and apparatus are described for improved sealing across an annular space between facing sealing surfaces. Methods for mechanically setting and pressure energizing sealing ring assemblies are also described. In one aspect, several sealing ring assemblies are described, each of which include an outer seal body formed of elastically deformable metal and having an annular base with a pair of legs extending from the base to form a channel. A plurality of predominately non-deformable segments are positioned between the legs. The use of segments substantially reduces detrimental hoop stress which would hinder effective setting of a seal between the inner and outer members. In preferred embodiments, the legs and the segments each present raised portions which are offset from each other. The offset arrangement of the raised portions permit the ring assembly to be mechanically set by radial spring loading through elastic deformation of portions of the seal body. The ring assembly is then further energized through increased fluid pressure within the annular space which enters the channel of the seal ring to urge the legs into tighter engagement with the inner and outer members.

9 Claims, 11 Drawing Sheets

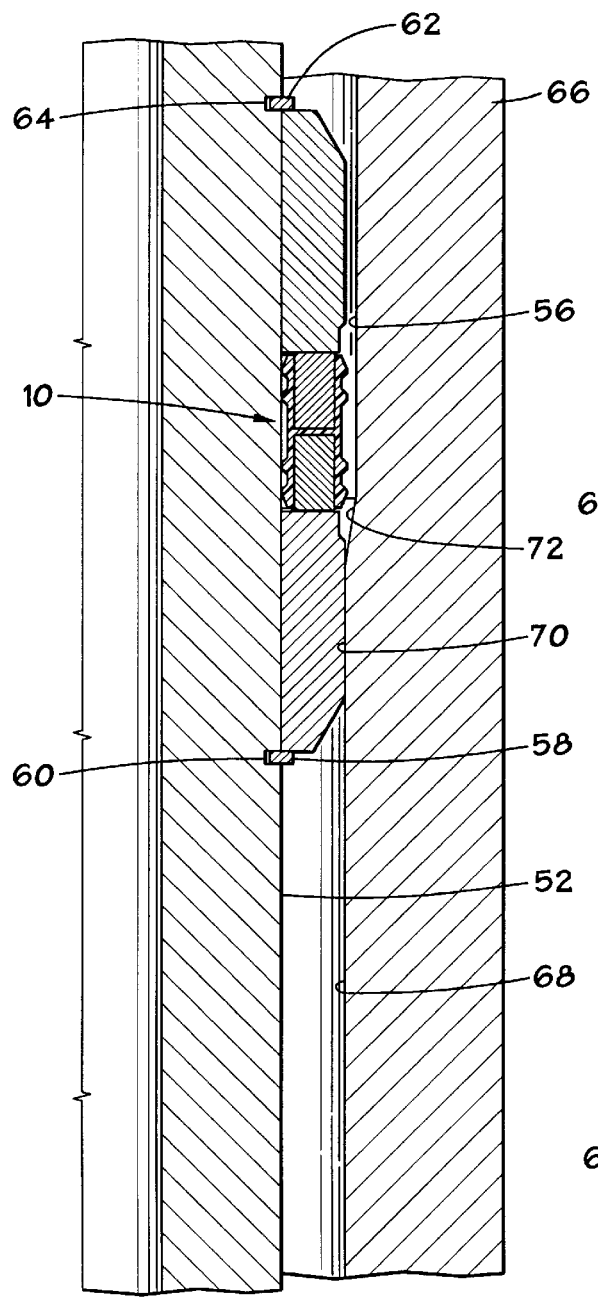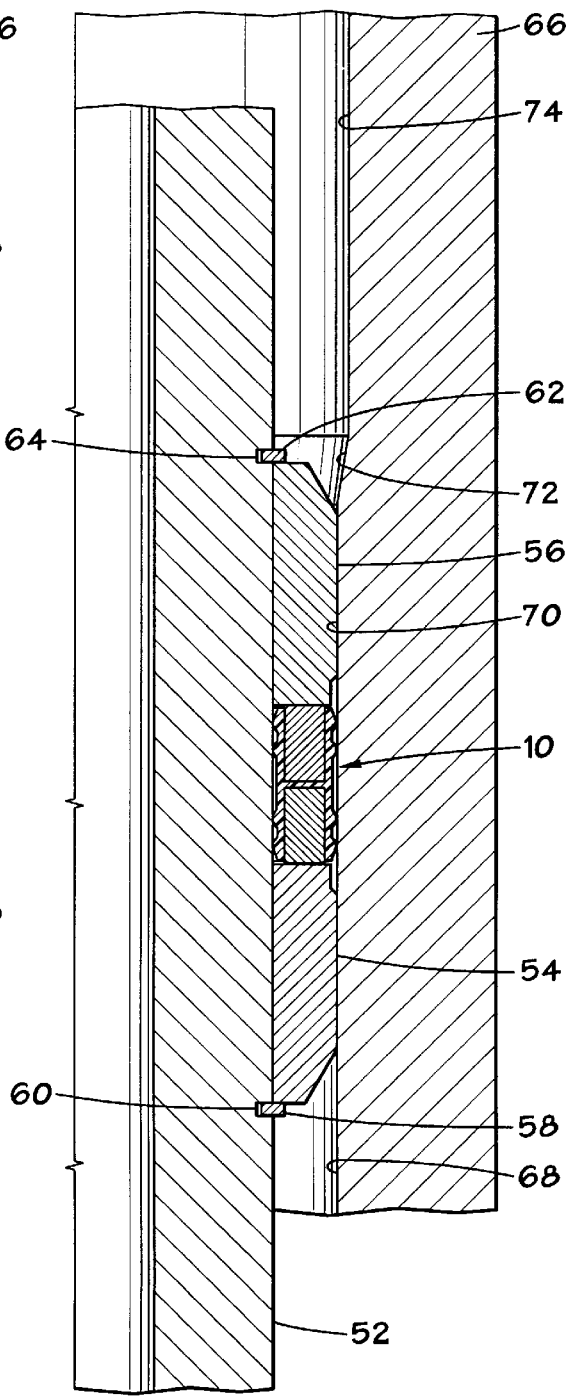
FIG. 3
FIG. 4

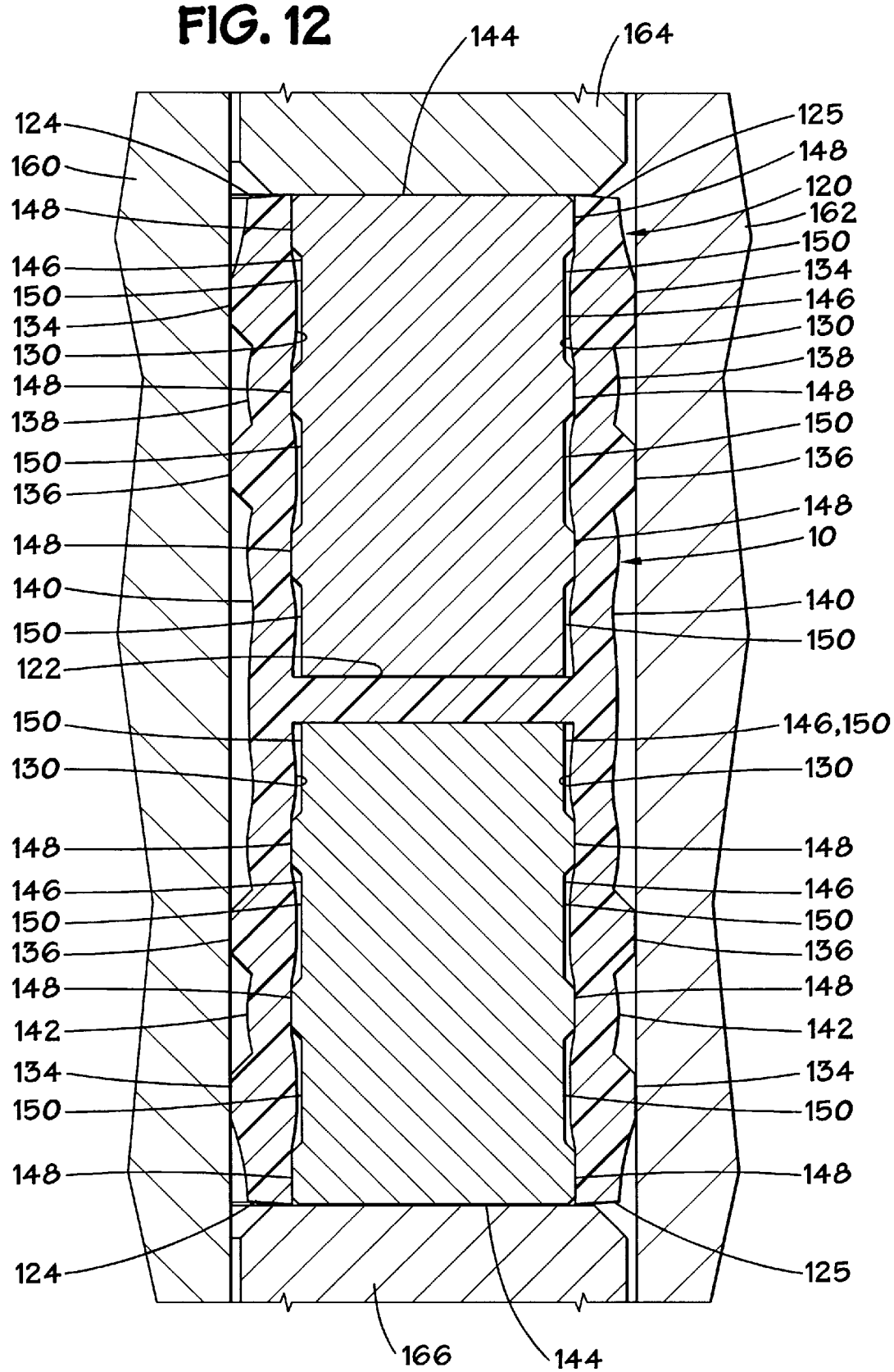

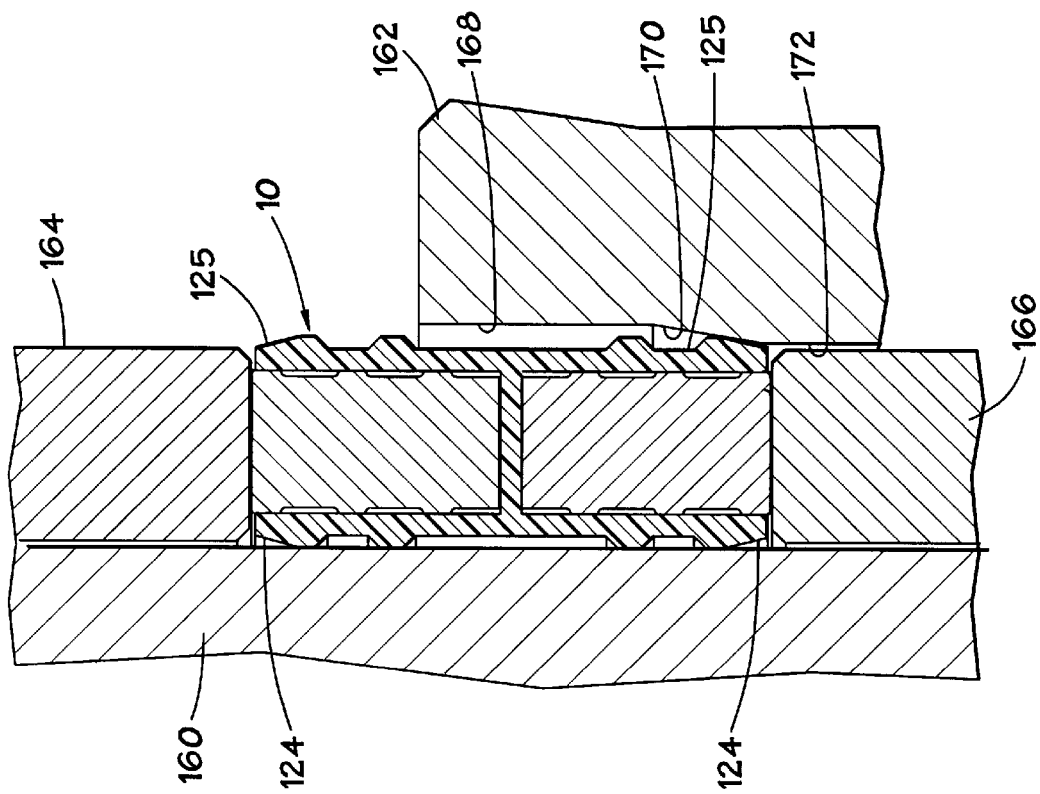
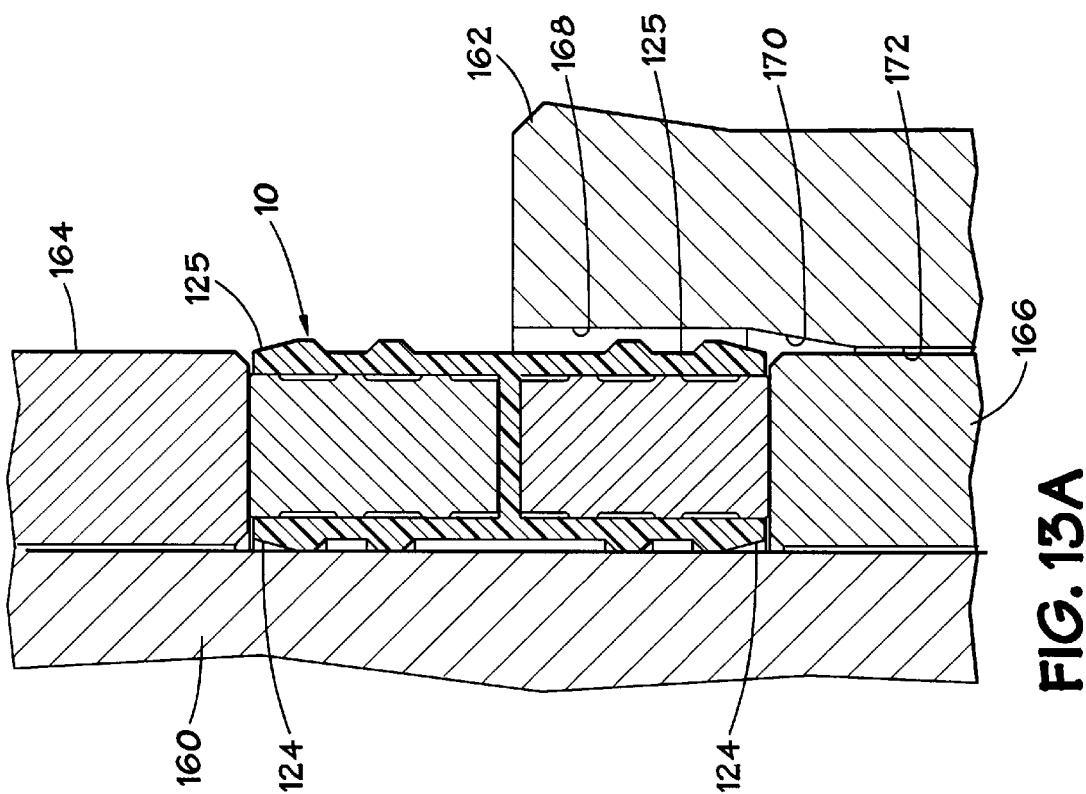

ANNULAR SEALING ASSEMBLY AND METHODS OF SEALING

CROSS-REFERENCE TO RELATED APPLICATIONS

This is a continuation-in-part of application Ser. No. 08/444,081 filed May 17, 1995, (now abandoned) which was a continuation of application Ser. No. 08/052,777, filed Apr. 26, 1993 (now abandoned).

STATEMENT REGARDING FEDERALLY SPONSORED RESEARCH OR DEVELOPMENT

Not Applicable.

BACKGROUND OF THE INVENTION

1. Field of the Invention

The present invention relates to an improved annular seal assembly which has particular application to sealing across annular spaces between facing cylindrical surfaces, such as the annular seal between the exterior of a hanger and the surrounding housing in a well.

2. Description of the Related Art

Prior annular seal assemblies have used annular seals having a U-shaped section with expander rings positioned in the space between the two legs of the ring to, either mechanically or in response to pressure, urge the expander ring inwardly of the legs to wedge the legs outward into sealing engagement with the facing cylindrical surfaces to effectively seal across the annulus between such surfaces.

U.S. Pat. No. 3,288,472 to B. J. Watkins discloses a metal seal which includes a U-shaped ring having legs extending axially away from an annular base and tapering outwardly at an angle preferred to be approximately 2°. This provides an interference fit for the legs of the seal ring with respect to the surfaces against which they are to seal. U.S. Pat. Nos. 3,378,269; 4,766,956; and 5,031,923 all disclose similar metal seals which include annular metal seal rings having a U-shaped section and having an interference fit with the surfaces against which they are to seal.

U.S. Pat. No. 2,075,947 discloses a pipe joint which includes a soft metal seal ring having a pair of upwardly extending spaced legs and a pair of downwardly extending spaced legs with an annular hard metal wedging member positioned between each pair of legs and energized by the nut to be forced between the legs to urge the legs radially into sealing engagement with the outer and inner annular cylindrical surfaces against which they are to seal. Other prior art patents disclosing similar structures include U.S. Pat. Nos. 3,915,462; 2,766,956; 4,900,041 and 5,044,672.

U.S. Pat. No. 3,326,560 to M. D. Trbgovich discloses an adjustable annular seal which has a V-shape and includes a split ring expander positioned between the diverging legs of the seal ring with suitable shoulders containing and urging the seal ring and expander together so that the expander urges the legs of the seal ring radially into sealing engagement with the annular walls against which it is to seal. The expander is described as being substantially coextensive in length with the sealing ring and being resiliently compressible for urging the walls (legs) apart to compensate for wear of the sealing portions. It is stated that the expander should be constrained from moving into engagement with the sealing surfaces and thus should not act as a sealing element itself. It should be noted that this patent specifically suggests the use of a split ring as the expander, it does not suggest any particular advantages. It could be that the advantage was that it was easier to install than a solid ring since it had to be assembled within the seal ring and in the space bounded by the sealing surfaces and the shoulders which urge the expander into the seal ring so that its sealing legs are urged toward the sealing surfaces.

The Lee Company manufactures hydraulic inserts or plugs which are adapted to be inserted into an opening to close and seal the opening. The Lee plug is cylindrical with a tapered reamed hole part way through its center and numerous small grooves in its exterior surface. It is used with a tapered reamed hole part way through its center and numerous small grooves in its exterior surface. It is used with a tapered pin which is driven into the reamed hole until the plug and the pin are flush with each other. The pin wedges the tapered sides of the plug into biting engagement with the surrounding material forming independent seals and retaining rings. This plug does not have any use for sealing across an annulus.

SUMMARY OF THE INVENTION

The seal assemblies and associated methods of the present invention provide for improved sealing qualities by permitting substantially uniform metal-to-metal sealing. The invention also permits mechanical setting of the seal assembly without requiring excessive setting load forces. The seal assembly is then energized using fluid pressure.

An improved seal assembly is described which has an annular metal sealing body having at least one U-shaped channel cross-section and a plurality of segments positioned within the channel. The legs of the channel are connected with an annular base and extend generally perpendicularly to the base. The sealing body is made of a relatively soft steel and the segments are made from a ring of harder steel which is cut into segments by a suitable cutting method which has a minimum kerf. On installation between the surfaces against which it is to seal, the legs are forced toward the segments and the segments transmit this force to the other leg so that they are both in sealing engagement with their respective sealing surfaces. The transmission of this force by the segments is not dependent on overcoming the substantial hoop stresses which would be present in a continuous energizing ring since the ring has been cut into segments. Hoop stress is also known as circumferential stress or tangential stress. The segments are cut from the ring with a minimum kerf at each cut so that they substantially fill the space between the legs completely around the circumference of the sealing body. The segments present radial faces which adjoin the legs of the sealing body. The radial faces include one or more raised ribs which contact the inner surfaces of the legs of the body.

An offset placement of the raised ribs on the segments from those on the outer surfaces of the legs of the sealing body causes radial spring loading to occur within the seal assembly through elastic deformation in the seal body. This spring loading gives the seal assembly greater radial compliance. The increased compliance permits a lower installation load for the seal assembly and causes it to be greatly accommodating to radial movement of the inner and outer annular members which may occur due to high pressure loading or thermal changes.

Methods are described for setting the seal assembly mechanically and then energizing it. Fluid pressure is introduced into the annular space to energize and improve the sealing ability of the seal assembly.

An object of the present invention is to provide an improved sealing assembly for sealing across an annulus which requires a minimum amount of setting load and provides improved sealing.

Another object of the present invention is to provide an improved annular sealing assembly for sealing across the annulus between the interior of a well member and the exterior of another well member in a well.

A further object of the present invention is to provide an improved annular sealing assembly for sealing across the annular space between the exterior of a well hanger and the interior of the well member into which the well hanger is landed.

Still another object is to provide an improved annular sealing assembly for sealing between two spaced apart sealing surfaces in which improved metal-to-metal sealing is provided and initial sealing is sufficient to retain sealing when pressure is supplied to the open end of the sealing ring.

BRIEF DESCRIPTION OF THE DRAWINGS

These and other objects and advantages of the present invention are hereinafter shown and explained with respect to the drawings wherein:

FIG. 3 is a partial sectional view of another form of an improved seal assembly positioned between two tubular members immediately prior to being moved into a set condition. In this form of the invention, the seal assembly is carried by the inner member and is moved downwardly within the outer member which has a tapered inner surface which moves the seal assembly into a set condition.

FIG. 4 is a partial sectional view of the form of the invention shown in FIG. 3 with the seal assembly in a set condition.

FIG. 12 is an enlarged cross-sectional cut-away view of the seal assembly of FIGS. 8 and 10 after having been mechanically set.

FIG. 13A is a cross-sectional cut-away view of a seal assembly carried on an internal member and in an unset condition.

FIGS. 13B–13D depict setting of the seal assembly shown in FIG. 13A.

DESCRIPTION OF THE PREFERRED EMBODIMENTS

Figure 1:
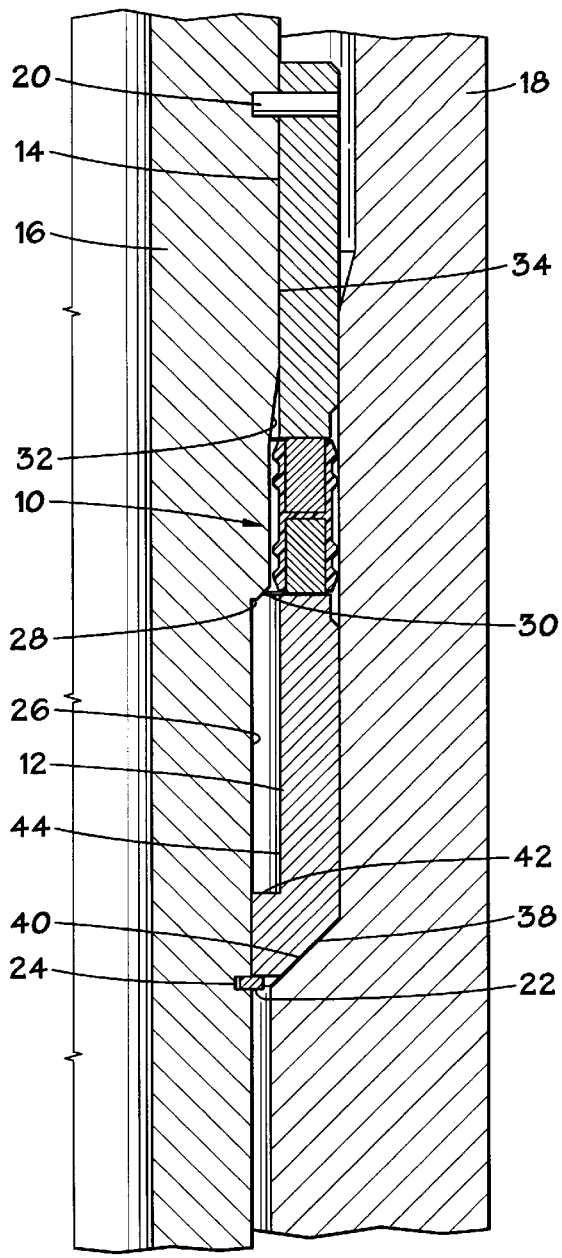
FIG. 1 is a partial sectional view of an improved seal assembly positioned between two tubular well members and showing its position immediately prior to being moved into its sealing position.

In FIG. 1, a preferred form of the seal assembly 10 of the present invention is shown carried between lower support ring 12 and upper sleeve 14. Inner cylindrical member 16 is disposed within the interior of an outer cylindrical member 18 with the seal assembly 10 supported thereon as shown. Upper sleeve 14 is releasably secured to inner member 16 by shear pins 20. Lower support ring 12 is supported on snap ring 22 mounted in groove 24 in the exterior of the portion of inner member 16 which is illustrated. The inner member 16 has a lower surface 26 extending above snap ring 22 to downwardly facing shoulder 28. The lower outer corner of shoulder 28 is beveled at 30 to allow ease of assembly of sealing ring assembly 10 thereon and surface 32 above bevel 30 is tapered upwardly and outwardly.

Surface 32 thus provides the wedging surface to cause the setting of sealing assembly 10 as it reaches the outer sealing surface 34 above surface 32. The lower support ring 12 has an external diameter to slide easily within the surface 36 of outer member 18 and a lower tapered outer surface 38 which is adapted to engage upwardly facing tapered seat 40. The interior of the lower portion of lower support ring 12 fits easily around the exterior of inner member 16 and has internal upwardly facing shoulder 42 with rim 44 extending thereabove to engage the lower portion of sealing ring assembly 10 and having a radial thickness to fit around sealing surface 34 of inner member 16.

Figure 2:
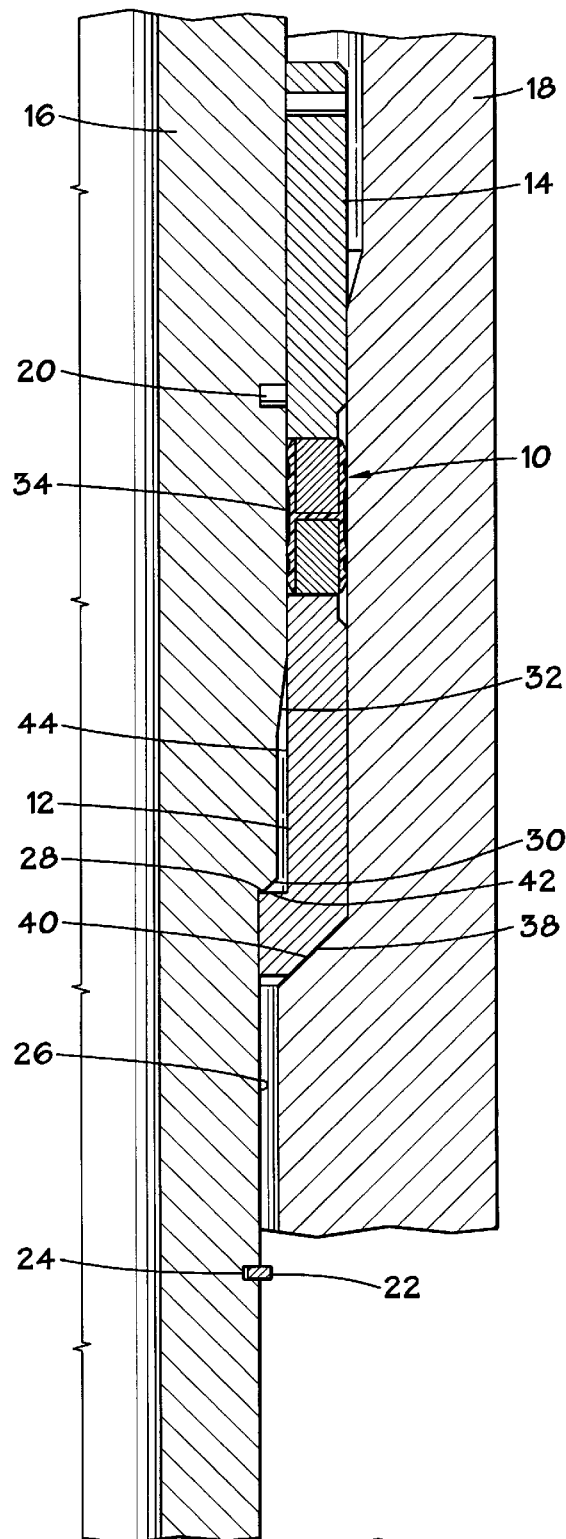
FIG. 2 is a partial sectional view of the apparatus shown in FIG. 1 but illustrating the sealing position of the seal assembly against the sealing surfaces of the two tubular well members. The inner member which has an external taper has been moved downward with respect to the outer member and the seal assembly.

FIG. 2 depicts the seal assembly 10 in its mechanically set condition so that the seal assembly provides a metal-to-metal seal against the sealing surface 34 on the exterior of inner member 16 and the sealing surface 36 on the interior of outer member 18. The ring assembly 10 has been placed into this set condition by downward movement of the inner member 16 with respect to the outer member 18 from the position depicted in FIG. 1 to the position depicted in FIG. 2. This movement occurs as a result of mechanical application of a setting load to the inner member 16. In wellbore applications, this setting load is typically applied to the inner member by a tool from the surface of the wellbore. As the lower support ring 12 lands on seat 40, further downward movement of inner member 16 results in shearing of the pin 20 so that the inner member 16 moves downward within the interior of rim 44. The tapered surface 32 is disposed downwardly through the seal assembly 10 to cause it to move to its mechanically set condition, the details of which are more clearly set forth with respect to the description of the structure of the seal assembly 10. An example of a preferable setting load is one which approximates or is slightly above the shearing load required to shear a pin or other member, such as shear pin 20 in FIGS. 1 and 2, in order to cause a tapered setting surface to be moved past the seal assembly. It is further pointed out that acceptable setting loads are currently considered to be on the order of 40,000–60,000 lbs.

In a modified form of the present invention shown in FIGS. 3 and 4, the seal assembly 10 is supported on an inner cylindrical member 50 between lower support ring 52 and upper support ring 54. Snap ring 56 is positioned in groove 58 on the lower exterior of inner member 50 to prevent lower support ring 52 from moving downward on inner member and snap ring 60 positioned in groove 62 on the upper exterior of inner member 50 to prevent upper support ring 54 from being forced upwardly on inner member 50. Outer member 64 includes a lower central bore 66; a slightly outwardly and upwardly tapered setting bore 68 thereabove; an outwardly and upwardly tapered bore 70 located above setting bore 68; and an upper straight bore 72 extending thereabove.

The downward movement of seal assembly 10 within outer member 64 is shown in the positions in FIGS. 3 and 4. In FIG. 3, the inner member 50 is moving downward within outer member 64 with the sealing ring assembly 10 approaching tapered setting bore 68. In FIG. 4, the inner member 50 has moved downwardly to the point that seal assembly 10 is in sealing engagement with lower central bore 66 and thus provides a metal-to-metal sealing engagement against the exterior of inner member 50 and against the interior of the outer member 64. This sealing engagement is hereinafter explained in greater detail.

Figures 5, 6:
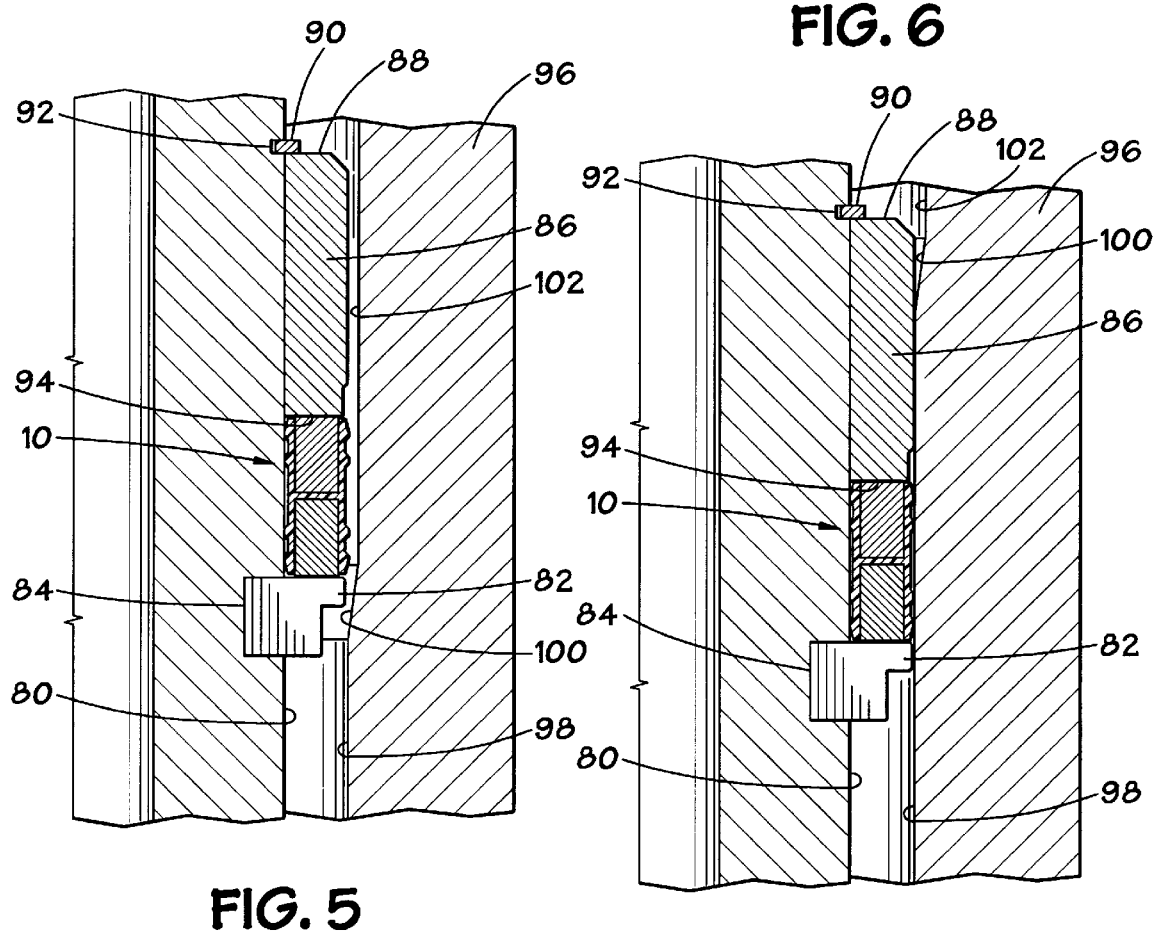
FIG. 5 is a partial sectional view of another form of the improved seal assembly positioned between two tubular members and in an unset condition.
FIG. 6 is a partial sectional view of the form of the seal assembly shown in FIG. 5 and in a set condition.

A further arrangement for setting a seal assembly in accordance with the present invention is depicted in FIGS. 5 and 6 where exemplary seal assembly 10 is supported on an inner member 80, such as a hanger, by a lower cylindrical support 82. The support 82 is positioned in an annular channel 84 within the inner member 80. A cylindrical spacer 86 is located above the sealing ring assembly 10. The upper end 88 of the spacer 86 abuts a snap ring 90 which is seated in a groove 92 in the inner member 80. The lower end 94 of the spacer 86 contacts the seal assembly 10.

The outer member 96 features a lower, reduced diameter inner bore 98. Above the lower bore 98 is an upwardly and outwardly tapered intermediate bore 100 which leads to an expanded upper bore 102.

FIG. 5 depicts the seal assembly 10 located in the upper bore 102 in an unset condition. In FIG. 6, the inner member 80 has been moved downwardly with respect to the outer member 96 so that the seal assembly 10 is moved into the reduced diameter lower bore 98, thereby becoming mechanically set by the tapered setting surface presented by the intermediate bore 100.

Figure 7:
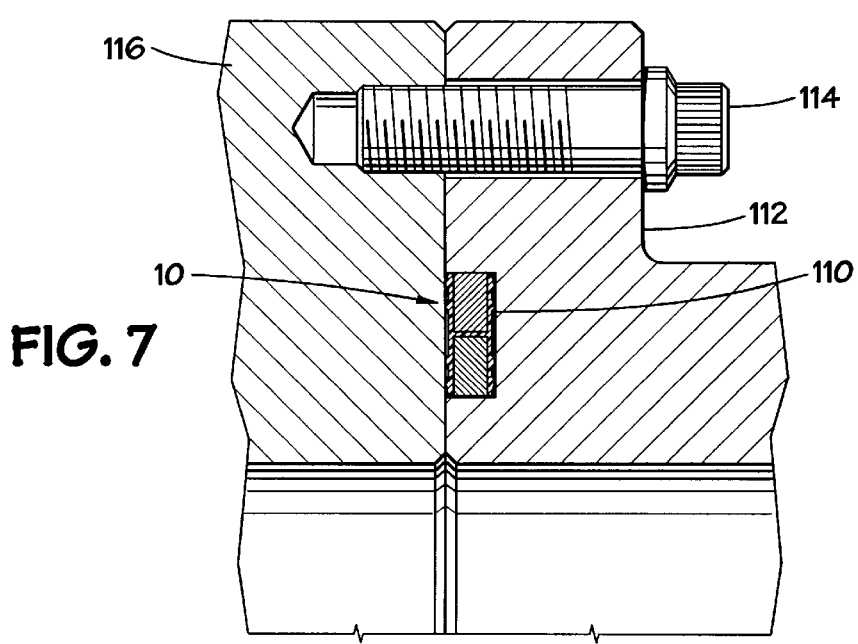
FIG. 7 is a partial sectional view of another form of a seal assembly constructed in accordance with the present invention which provides a seal between opposing faces of joined flanges.

Another form of the present invention wherein the improved sealing ring assembly may be used is illustrated in FIG. 7 wherein seal assembly 10 is positioned in face groove 110 in flange 112. Flange 112 is secured by cap screws or other suitable fastening means 114 to a structure having a bore therethrough, such as flange 116. Seal assembly 10 is initially positioned within groove 110 and as means 114 are tightened it is brought to its set condition in sealing engagement between the face of flange 116 and the bottom of groove 110.

Turning now to FIGS. 8, 10–12 and 13A–13D, the preferred exemplary seal assembly 10 of the present invention is now described in greater detail. The seal assembly 10 includes an outer seal body 120, best shown in FIG. 11, which is made of a relatively soft steel. The seal body 120 of the preferred embodiment presents an H-shaped cross-section wherein a central web flange 122 has two pairs of relatively parallel inner and outer leg members, 124, 125, respectively, extending generally perpendicularly from the flange 122 so that two cross-sectionally U-shaped channels 126 and 128 are formed on either side of the flange 122. The legs 124, 125 each present a first surface 130 which faces into the respective U-shaped channel 126, 128 which it helps define, and a second surface 132 which faces away from the channel. A pair of raised annular ribs 134, 136 is disposed on each of the second surfaces 132 of each leg 124, 125. The annular rib 134 is located further from the central flange 122 than rib 136. It presents an engagement face 134a and angled side faces 134b and 134c. Preferably, side face 134b is angled at approximately 30° while side face 134c is angled at approximately 45°. Rib 136 also presents an engagement face 136a and angled side faces 136b and 136c. However, both side faces 136b, 136c are preferably angled at approximately 45°.

The raised ribs 134, 136 define unraised annular bands 138, 140 and 142 located adjacent to the ribs 134, 136. The legs 124, 125 have less thickness along an unraised annular band 138, 140 or 142 than they have along a raised rib 134, 136.

Figure 10:
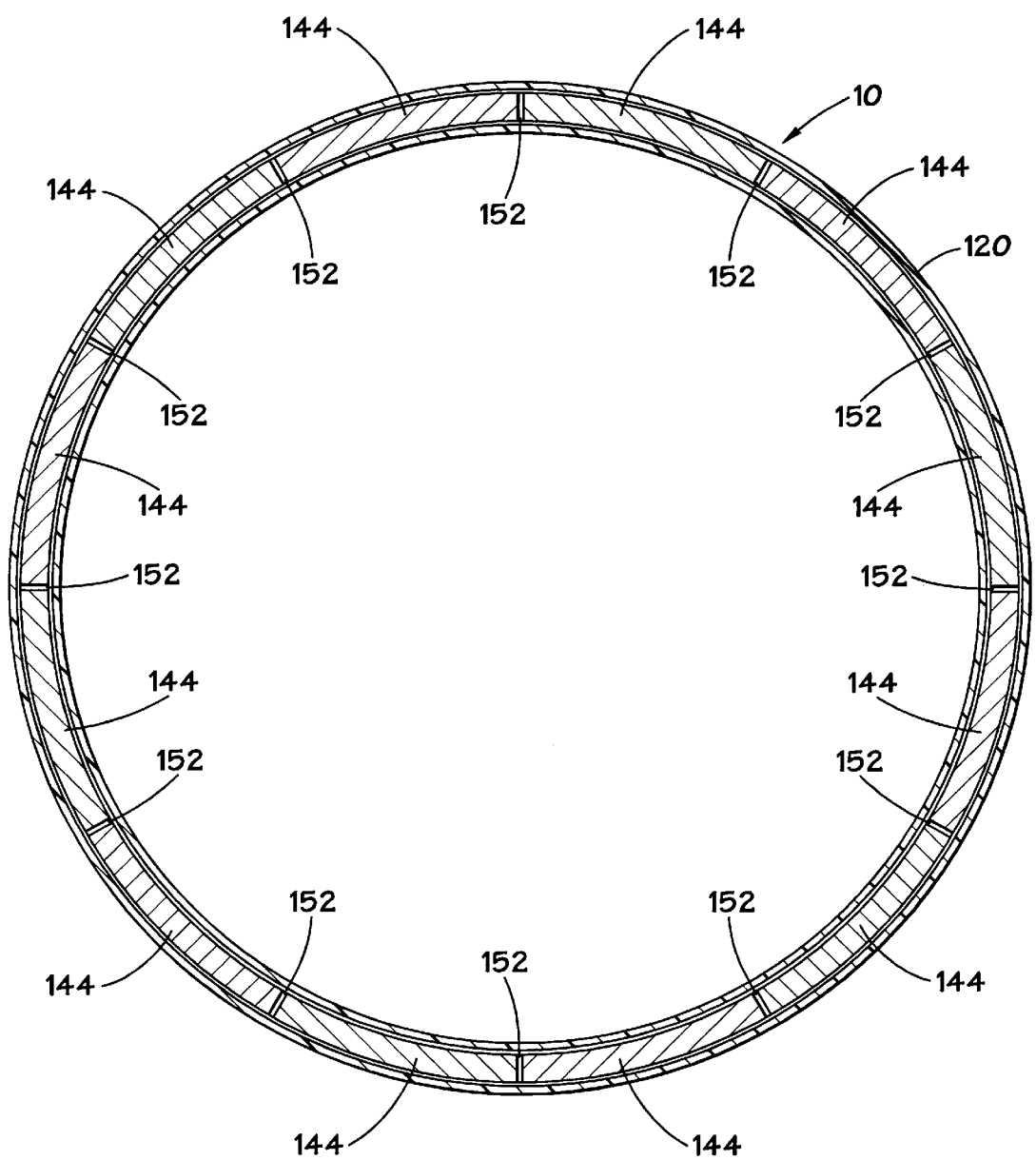
FIG. 10 is a cut-away view of the seal assembly of FIG. 8, showing a plurality of segments retained within the seal body.
Figure 11:
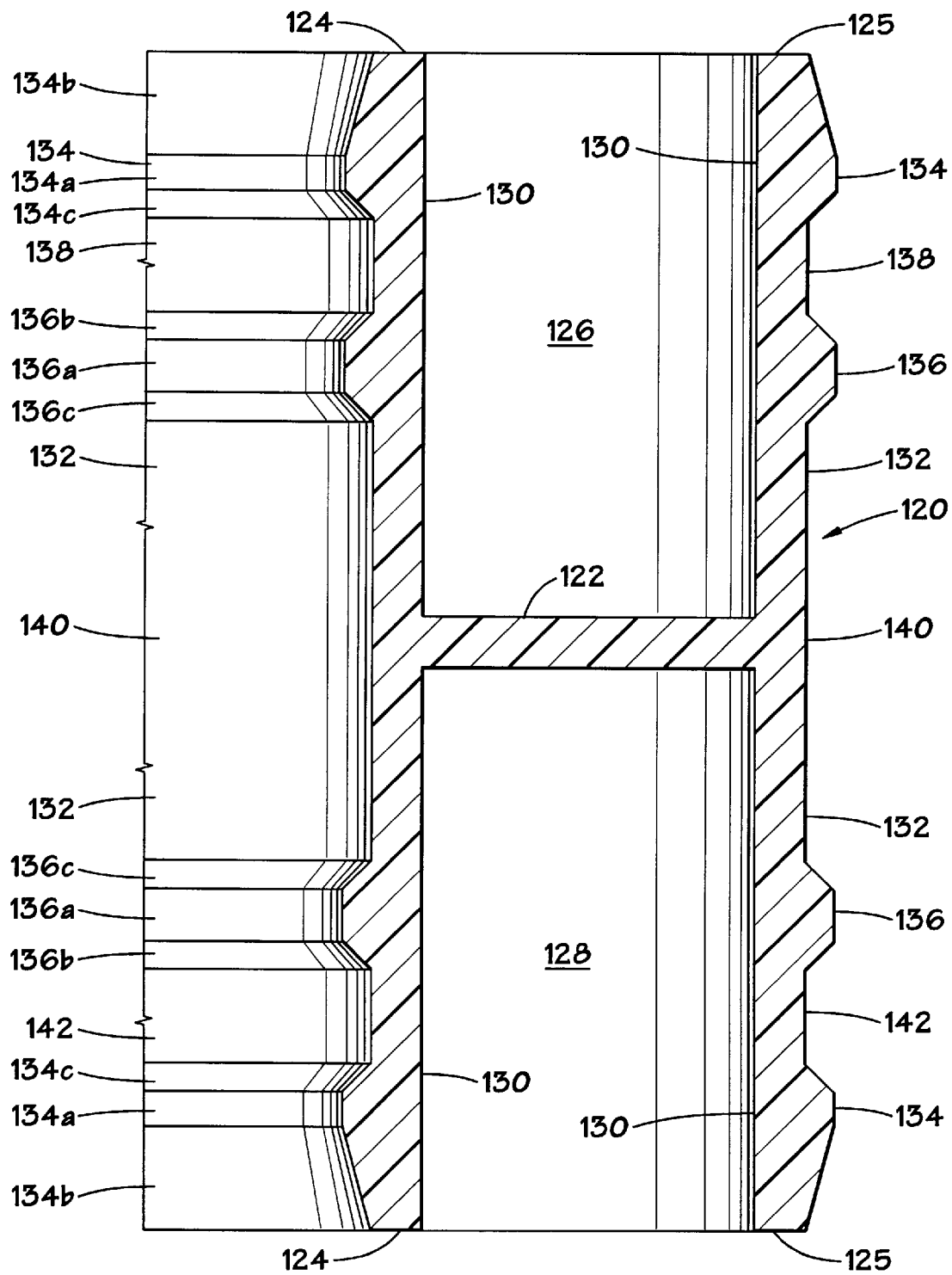
FIG. 11 is a cross-sectional cut-away view of the seal body of the seal assembly of FIGS. 8 and 10.

A plurality of ring segments 144 are located within the U-shaped channels 126 and 128 of the seal body 120. Although there are at least two segments 144 in each of the channels, it is preferred that there be a greater number such as 12, 24 or 48. FIG. 10 shows 12 such segments 144 which are not connected to each another and are positioned adjacent to one another within a channel. The segments 144 substantially fill the entire circumference of the channels of the seal body 120. Each of the segments 144 is arcuately curved with generally the same curvature as that of the seal body 120. Preferably, the segments 144 are created by machining a solid ring into segments with a minimum kerf. The segments 144 are formed of a harder metal than that which forms the outer seal body 120 such that the segments 144 are substantially non-deformable.

It is preferred that the seal body 120 be formed of a metal or other material which is substantially softer than that which forms the segments 144 as well as that which forms the inner and outer members, such as 80 and 96. Currently, the best results have been obtained using a metal having a hardness of approximately 25–35 on the Rockwell hardness scale to form the segments 144, and a metal having a hardness of around 10 on that scale to form the seal body 120. The greater softness of the seal body 120 results in less scratching of inner and outer members, such as 80 and 96, from the setting of the seal. Such scratching is undesirable as it may result in fluid leakage along the scratches and defeat the effectiveness of a seal assembly.

Figure 8:
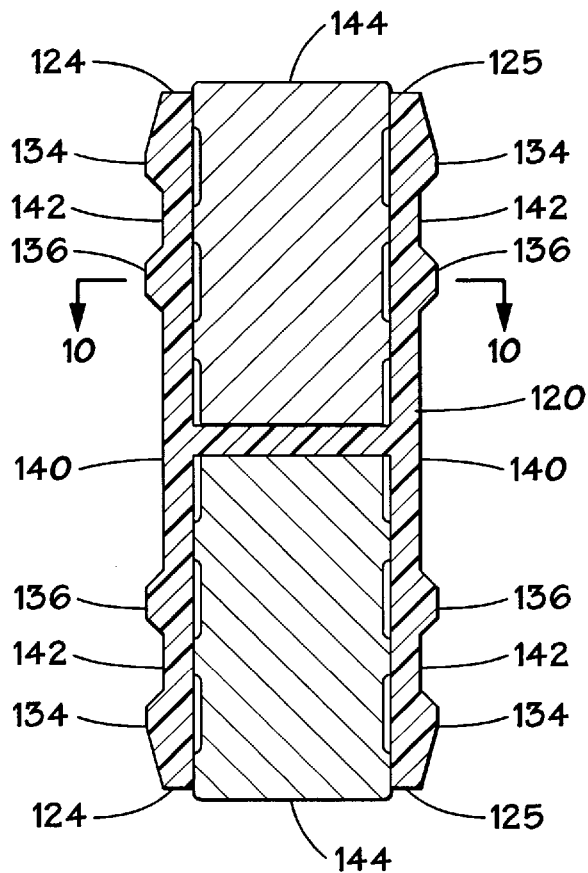
FIG. 8 is a cross-sectional cut-away view of an exemplary bidirectional double sealing ring assembly constructed in accordance with the present invention.

As best shown in FIGS. 8 and 12, the segments 144 have a rectangular cross-section and present radial side surfaces 146 which are adapted to adjoin the channel-facing surfaces 130 of the legs 124, 125 of the seal body 120. The side surfaces 146 each present leg-contacting projections 148 which contact the channel-facing surfaces 130 on the legs 124, 125. These projections 148 are adjacent non-projected portions 150 of the side surfaces 146. When the segments 144 are assembled within the channels 126, 128, the projections 148 contact the channel-facing surfaces 130 at a point offset, or straddled, from the raised bands 134, 136 of the legs 124, 125. Preferably, the projections 148 contact the channel-facing surfaces 130 at a point corresponding to the location of one of the unraised annular bands 138, 140 and 142 on the second surface 132.

As illustrated in FIG. 10, the segments 144 are preferably aligned with each other within the annular channels 126, 128 so that a slight average gap 152 is present between the segments 144 after the seal has been energized. The presence of such a gap 152 between the segments permits fluid pressure to enter the annular channels 126, 128 within the seal body 120. The gap 152 should not be too great as too great a gap would cause weakness in the structure of the seal assembly 10. A preferred gap size would be approximately 0.5 mm.

In the forms of the present invention, improved sealing is provided without dramatic increases in the installation loads required for setting the sealing assembly. The use of ring segments 144 between the inner and outer legs 124, 125 provides for load transmission between the sealing ring legs during installation without having to overcome substantial hoop stresses which would be present if a solid ring were used in place of segments 144. Hoop stresses in a continuous version of the segments 144 would result in considerable resistance to radial expansion or contraction of the seal assembly during installation. The wedging for setting is provided by the tapered surfaces leading into one of the sealing surfaces which causes one of the legs 124 or 125 to be wedged toward the other leg and cause the segments to transmit the setting load to the other leg so that it is also initially loaded into sealing engagement with the sealing surface against which it is to seal.

As shown in FIG. 12, improved seal assembly 10 is in a set condition positioned between two generally parallel walls of inner and outer cylindrical members 160 and 162. As hereinafter described, seal assembly 10 is to provide an improved metal-to-metal seal between facing surfaces of such members. As may be seen, mechanical setting of the seal assembly 10 creates a spring-type loading within the legs 124, 125 through predominantly elastic deformation of the seal body 120. Such mechanical setting also establishes an indirect load path across the seal assembly 10 which makes the seal assembly 10 less sensitive and more compliant to variations in seal bore diameter, finished dimensions, and expansion and contraction resulting from changes in pressure and thermal changes. Projections 148 on the side surfaces 146 are loaded against the unbanded portions 138, 140, 142 of the legs 124, 125 and cause the unbanded portions 138, 140, 142 to become load-deflected and biased away from the segments 144. This biasing creates moments within portions of the legs 124, 125 through elastic deformation the softer metal of the seal body 120 which urge the banded portions 134, 136 against the adjacent surfaces of inner and outer members 160, 162. This spring loading creates a radially compliant metal-to-metal seal between the seal assembly 10 and each of the inner and outer members 160, 162.

Figure 13D:
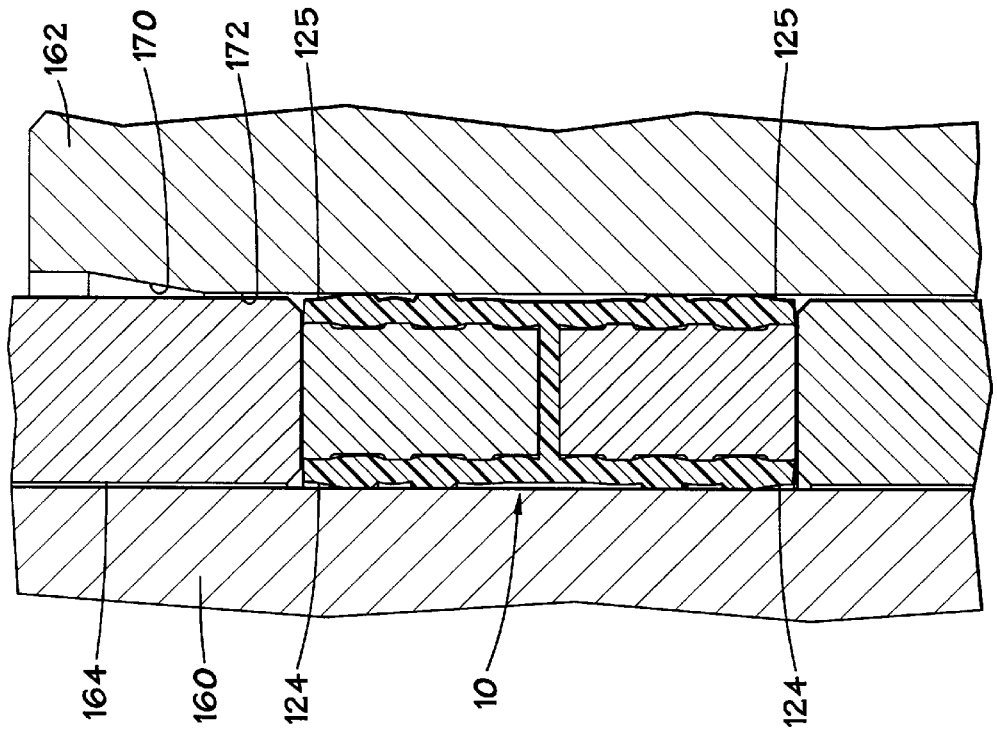
Figure 13C:
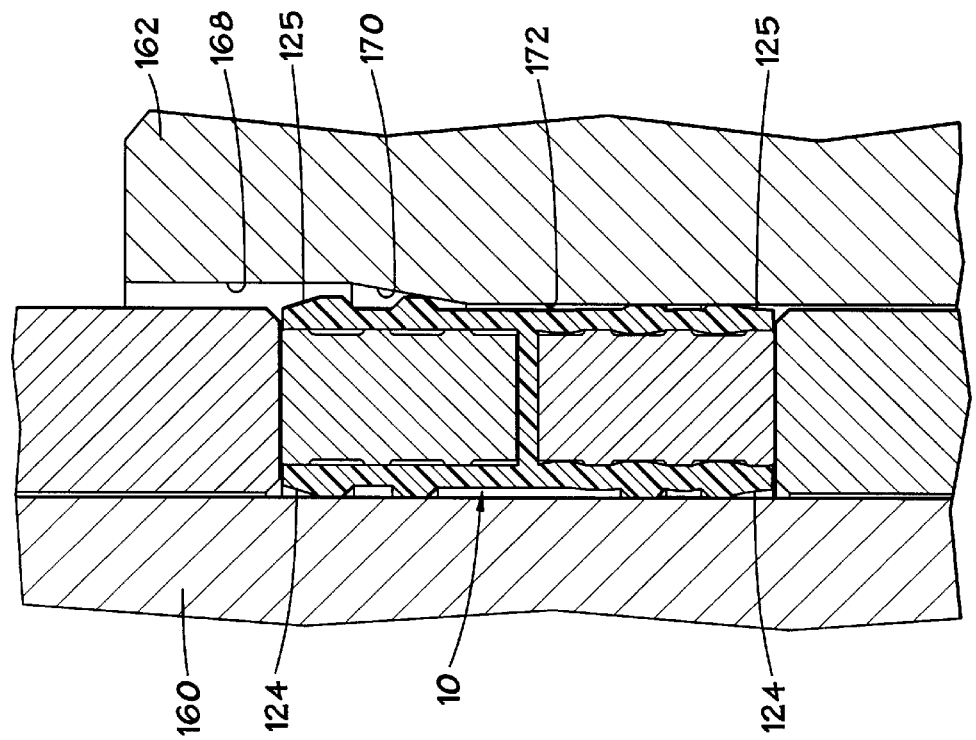

FIGS. 13A–13D depict, in greater detail, a mechanical setting sequence for the exemplary seal assembly 10 in which the seal assembly 10 is being set between an inner cylindrical member 160 and an outer cylindrical member 162. The seal assembly 10 is carried on the inner member 160 between an upper collar 164 and a lower collar 166. The outer cylindrical member 162 features an expanded diameter bore 168, a tapered setting bore 170 and a reduced diameter bore 172. The seal assembly 10 is located within the expanded diameter bore 168 and is in an unset condition. In FIGS. 13B and 13C, the inner member 160 and the seal assembly 10 are moved downwardly with respect to the outer member 162 such that the seal assembly 10 is moved into and through the tapered setting bore 170. During this movement, setting of the ring assembly 10 occurs as the outer legs 125 are biased toward the inner legs 124 by the surface of the tapered setting bore 170. In FIG. 13D, the inner member 160 has been moved downwardly to the extent that the seal assembly 10 has been moved into the reduced diameter bore 172. In FIG. 13D, the seal assembly 10 is in a set condition.

Figure 14A:
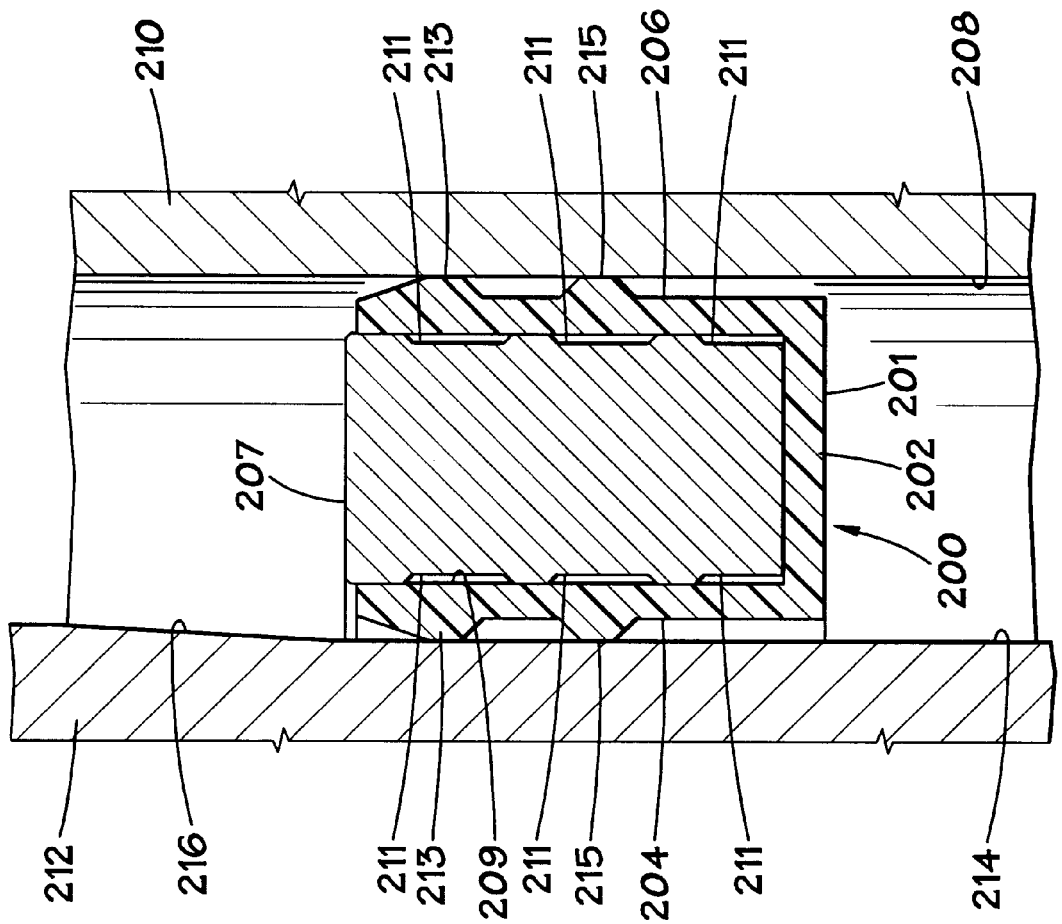
FIG. 14A is a cross-sectional cut-away of an exemplary seal assembly in an unset condition.
Figure 14C:
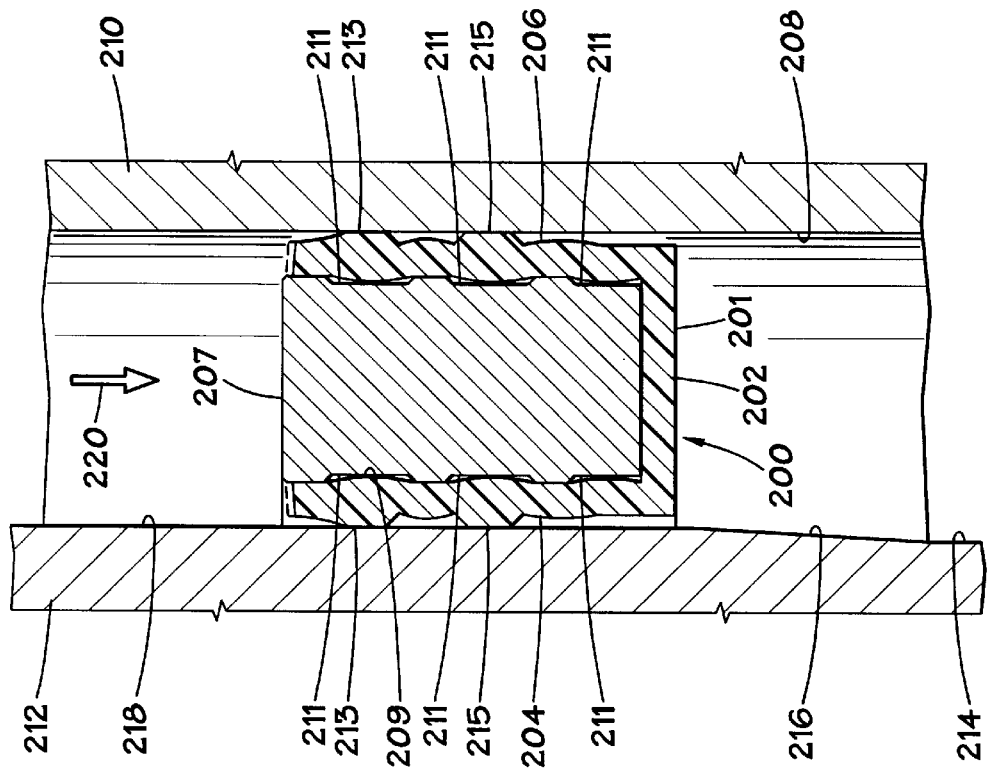
FIG. 14C depicts the seal assembly of FIGS. 14A and 14B after having been mechanically set and energized with fluid pressure.
Figure 14B:
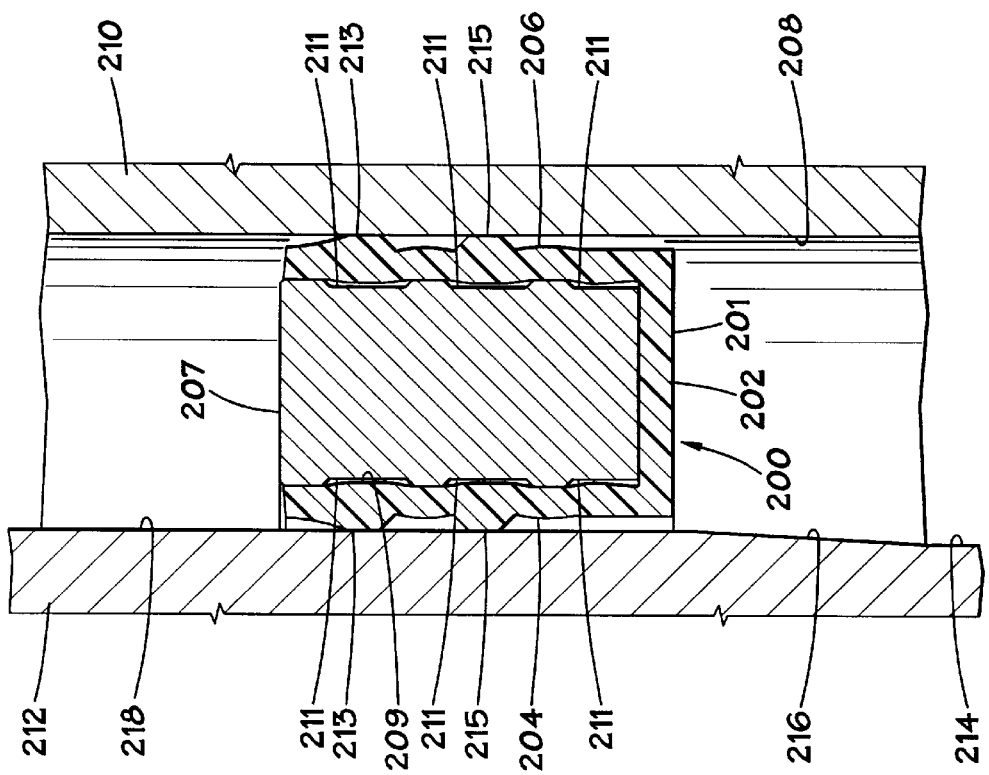
FIG. 14B depicts the seal assembly of FIG. 14A after it has been mechanically set.

Following mechanical setting, as described above, application of fluid pressure will energize a seal assembly constructed in accordance with the present invention. FIGS. 14A–14C depict mechanical setting and fluid pressure energization of a seal assembly 200 which, in this instance, is shown having a seal body 201 presenting a single U-shaped cross-section formed by the base 202 and inner and outer legs 204, 206, respectively, which are similar to legs 124 and 125 described earlier. Load-transmitting segments 207, having a cross-section similar to the segments 144 described earlier, are located within the channel 209 formed by the base 202 and legs 204, 206. The legs 204, 206 present raised bands 213, 215. It is pointed out that seal assembly 200 is useful for creating a unidirectional seal, or a seal which seals against fluid pressure which is applied from only one direction.

The seal assembly 200 is located within a straight bore 208 formed within a cylindrical outer member 210. It is noted that, for the sake of clarity, upper and lower collars or support members for the ring assembly 200 are not shown in FIGS. 14A–14C although, in practice, these would be present and may be similar to the collars or support members described elsewhere in this specification or which are otherwise known and used in the art. The inner cylindrical member 212 features a reduced diameter section 214, a downwardly and outwardly facing tapered setting surface 216, and an enlarged diameter section 218. In FIG. 14A, the ring assembly 200 is in an unset condition and located within the bore 208 adjacent the reduced diameter section 214 of the inner member 212. In FIG. 14B, the inner member 212 has been moved downwardly with respect to the outer member 210 so that the tapered setting surface is moved past the seal assembly 200 and the enlarged diameter section 218 is located adjacent the seal assembly 200. In this position, the seal assembly 200 is in a mechanically set condition, as described earlier, such that load is transmitted between the outer and inner members 210, 212 across the seal assembly 200 through the legs 204, 206 and the load-transmitting segments 207 and portions of the legs 204, 206 become spring loaded through elastic deformation. This selected elastic deformation of portions of the seal body permits the seal assembly 200 to be mechanically set using setting loads which are not excessively high. Further, sealing of the seal assembly 200 against passage of pressure is relatively efficient because the raised bands 213, 215 on legs 204, 206 provide for multiple sealing barriers (two in this case) against the sealing surfaces of both the outer and inner members 210, 212.

In FIG. 14C, fluid pressure has been increased within the bore 208 above the seal assembly 200 so that the fluid pressure is exerted toward the seal assembly 200 in the direction of arrow 220 in order to energize the seal assembly 200. Due in part to the presence of gaps (such as gaps 152 shown in FIG. 10) between the segments 207, fluid pressure is capable of entering and exerting an expanding influence upon the channel 209 of the assembly 200. As may be seen by comparison of FIGS. 14B and 14C, pressure energization of the seal assembly 200 results in the legs 204, 206 being urged into more secure engagement with the inner and outer members 210, 212.

Construction of the seal assembly 200, as with the other seal assemblies described herein, results in a substantially uniform seal across the sealing surfaces involved. Because gaps, such as gaps 152, are disposed about the entire circumference of the ring assembly 200, the ring assembly 200 will receive the pressurized loading in a relatively uniform fashion about its circumference. Further, the pressurized fluid may be communicated throughout the channel 209 via fluid passages 211 which are formed adjacent the non-projected portions of the segments 207. Fluid pressurization of these passages will also assist in urging the raised ribs of legs 204, 206 into tighter engagement with the outer and inner members 210, 212 each time pressure is applied in the direction of arrow 220.

A feature of the preferred seal assembly 10 described above and shown in FIGS. 1–6, 8, 10 and 13A–13D is that the seal assembly 10 is capable of reliably sealing against fluid pressure from either or both axial directions in the bore. Seal assemblies of this type have been found to seal properly against test pressure loads of approximately 17,500 psi.

Figure 9:
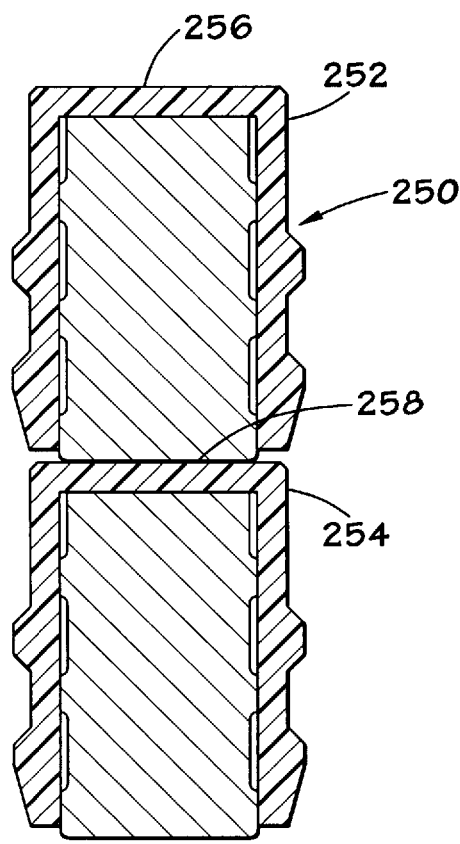
FIG. 9 is a cross-sectional cut-away view of a unidirectional double sealing ring assembly constructed in accordance with the present invention.

In the foregoing described installations of the improved sealing assembly of the present invention, two rings have been used with the open ends of the U-shaped portions of the sealing ring facing in opposite directions. This type of double seal ring was described in detail with respect to FIGS. 8, 10–12 and 13A–13D. However, sealing ring assemblies may be constructed in alternative configurations, such as the stacked, unidirectional seal assembly 250 of FIG. 9, in which two seal bodies 252, 254 are stacked so that the base 256, 258 of each is disposed in the same axial direction. Also, a seal assembly may be formed of a single U-shaped channel cross-section, as was depicted in FIGS. 14A–14C. Further, while the invention has been herein shown and described in what is presently believed to be the most practical and preferred embodiment thereof, it will be apparent to those skilled in the art that many other modifications may be made to the invention described while remaining within the scope of the claims.

What is claimed is:

1. An annular seal assembly for sealing across the annular space between a pair of tubular members, the seal assembly comprising:
   an annular seal body having an annular base with a pair of spaced apart legs extending from said annular base in one direction and with an annular space between said legs,
   a plurality of segments positioned in the annular space between the legs, at least one of said segments presenting a radial leg-contacting surface having at least one raised rib.

2. The seal assembly of claim 1 wherein each of said segments present a radial leg-contacting surface having at least one raised rib.

3. The seal assembly of claim 2 wherein at least one of said legs presents a surface for contacting one of said tubular members, the member-contacting surface having at least one raised rib.

4. The seal assembly of claim 3 wherein the raised rib of the member-contacting surface is offset from the raised rib of the leg-contacting surface so that portions of the seal body are deformed to cause spring loading when said rib is loaded radially.

5. The seal assembly of claim 1 wherein the number of segments comprises 12.

6. The seal assembly of claim 1 wherein the number of segments comprises 24.

7. The seal assembly of claim 1 wherein the number of segments comprises 48.

8. The seal assembly of claim 1 wherein the segments are spaced apart from each other by a gap.

9. An annular seal assembly for creating a seal within an annular space between a pair of tubular members, the seal assembly comprising:
   a seal body having a generally H-shaped cross-section formed by a central web with two pairs of relatively parallel legs extending generally perpendicularly therefrom to form two cross-sectionally U-shaped channels on either axial side of the web;
   a plurality of arcuate segments disposed within each of the U-shaped channels of the seal body, the segments being formed of a substantially harder material than the material forming the seal body, the segments contacting and adapted to transmit load between the legs forming the channel;
   said segments presenting radial side surfaces to contact the legs, the side surfaces each presenting a plurality of raised projections;
   a plurality of raised annular ribs disposed along each of said legs in an offset arrangement to the raised projections of said segments so that portions of the seal body become deformed to cause spring loading when the rib is loaded radially.

* * * * *